(12) United States Patent
Pande et al.

(10) Patent No.: US 12,428,788 B2
(45) Date of Patent: Sep. 30, 2025

(54) MOLDED PULP PRODUCTS INCORPORATING SURFACE ENHANCED PULP FIBERS AND METHODS OF MAKING THE SAME

(71) Applicant: Domtar Paper Company, LLC, Fort Mill, SC (US)

(72) Inventors: Harshad Pande, Fort Mill, SC (US); Tarik Jabrane, Fort Mill, SC (US)

(73) Assignee: Domtar Paper Company, LLC, Fort Mill, SC (US)

( * ) Notice: Subject to any disclaimer, the term of this patent is extended or adjusted under 35 U.S.C. 154(b) by 232 days.

(21) Appl. No.: 17/754,609

(22) PCT Filed: Oct. 7, 2020

(86) PCT No.: PCT/US2020/054470
§ 371 (c)(1),
(2) Date: Apr. 7, 2022

(87) PCT Pub. No.: WO2021/071870
PCT Pub. Date: Apr. 15, 2021

(65) Prior Publication Data
US 2022/0364313 A1    Nov. 17, 2022

Related U.S. Application Data

(60) Provisional application No. 62/911,896, filed on Oct. 7, 2019.

(51) Int. Cl.
*D21J 3/00*    (2006.01)
*D21H 19/34*   (2006.01)
*D21H 21/52*   (2006.01)

(52) U.S. Cl.
CPC ............... *D21J 3/00* (2013.01); *D21H 19/34* (2013.01); *D21H 21/52* (2013.01)

(58) Field of Classification Search
CPC ... D21J 3/00; D21J 1/08; D21H 19/34; D21H 21/52; D21H 27/10; D21H 11/18; Y02W 90/10; B65D 25/34; B65D 1/25
See application file for complete search history.

(56) References Cited

U.S. PATENT DOCUMENTS 3,098,785 A    7/1963  Meiler
3,388,037 A    6/1968  Asplund et al.
(Continued)

FOREIGN PATENT DOCUMENTS

AU    2015218812 B2    4/2017
AU    2013305802 B2    5/2017
(Continued)

OTHER PUBLICATIONS

International Search Report and Written Opinion from corresponding International Application No. PCT/US2020/054470 dated May 2, 2021, International Filing Date Oct. 7, 2020.
(Continued)

*Primary Examiner* — Abbas Rashid
*Assistant Examiner* — Matthew M Eslami
(74) *Attorney, Agent, or Firm* — TROUTMAN PEPPER LOCKE LLP; Alison L. McCarthy; Celeste K. Walker (57) ABSTRACT

In a particular implementation, a method of pulp product manufacture includes spraying a surface enhanced pulp fiber (SEPF) coating on at least a portion of a molded pulp product, the SEPF coating comprising SEPF having a length weighted average fiber length that is at least 0.20 millimeters (mm) and an average hydrodynamic specific surface area that is at least 10 square meters per gram ($m^2/g$).

11 Claims, 5 Drawing Sheets

(56) References Cited

U.S. PATENT DOCUMENTS

| | | | |
|---|---|---|---|
| 3,519,211 A | 7/1970 | Marsan et al. | |
| 3,708,130 A | 1/1973 | Perry | |
| 3,794,558 A | 2/1974 | Back | |
| 3,873,412 A | 3/1975 | Charters et al. | |
| 3,891,499 A | 6/1975 | Kato et al. | |
| 3,920,508 A | 11/1975 | Yonemori | |
| 3,966,543 A | 6/1976 | Cayle et al. | |
| 4,012,279 A | 3/1977 | Selander et al. | |
| 4,054,625 A | 10/1977 | Kozlowski et al. | |
| 4,247,362 A | 1/1981 | Williams | |
| 4,337,116 A * | 6/1982 | Foster | B32B 27/10 428/36.1 |
| 4,635,864 A | 1/1987 | Peterson et al. | |
| 4,895,019 A | 1/1990 | Lehmikangas et al. | |
| 4,925,530 A | 5/1990 | Sinclair et al. | |
| 5,110,412 A | 5/1992 | Fuentes et al. | |
| 5,248,099 A | 9/1993 | Lahner et al. | |
| 5,308,449 A | 5/1994 | Fuentes et al. | |
| 5,695,136 A | 12/1997 | Rohden et al. | |
| 5,731,080 A | 3/1998 | Cousin et al. | |
| 5,824,364 A | 10/1998 | Cousin et al. | |
| 5,954,283 A | 9/1999 | Matthew | |
| 6,156,118 A | 12/2000 | Silenius | |
| 6,165,317 A | 12/2000 | Sabourin | |
| 6,251,222 B1 | 6/2001 | Silenius et al. | |
| 6,296,736 B1 | 10/2001 | Hsu et al. | |
| 6,348,127 B1 | 2/2002 | Gallagher et al. | |
| 6,375,974 B1 | 4/2002 | Ito et al. | |
| 6,537,680 B1 | 3/2003 | Norlander et al. | |
| 6,599,391 B2 | 7/2003 | Silenius et al. | |
| 6,773,552 B1 | 8/2004 | Albert et al. | |
| 6,861,380 B2 | 3/2005 | Garnier et al. | |
| 6,887,350 B2 | 5/2005 | Garnier et al. | |
| 6,935,589 B1 | 8/2005 | Matthew | |
| 6,946,058 B2 | 9/2005 | Hu | |
| 6,955,309 B2 | 10/2005 | Matthew et al. | |
| 7,381,294 B2 | 6/2008 | Suzuki et al. | |
| 7,624,879 B2 | 12/2009 | Frances | |
| 7,741,234 B2 | 6/2010 | Smith et al. | |
| 7,942,964 B2 | 5/2011 | Luo et al. | |
| 8,419,899 B2 | 4/2013 | Xia et al. | |
| 8,871,057 B2 | 10/2014 | Gane et al. | |
| 9,297,112 B2 | 3/2016 | Mesic et al. | |
| 9,816,233 B2 | 11/2017 | Shi et al. | |
| 9,879,361 B2 | 1/2018 | Pande et al. | |
| 9,920,484 B2 | 3/2018 | Marcoccia et al. | |
| 9,988,762 B2 | 6/2018 | Bilodeau et al. | |
| 10,563,356 B2 | 2/2020 | Marcoccia et al. | |
| 10,704,165 B2 | 7/2020 | Pande et al. | |
| 10,710,930 B2 | 7/2020 | Marcoccia et al. | |
| 11,473,245 B2 | 10/2022 | Marcoccia et al. | |
| 11,499,269 B2 | 11/2022 | Pande et al. | |
| 11,608,596 B2 | 3/2023 | Pande et al. | |
| 2002/0011317 A1 | 1/2002 | Lee | |
| 2002/0059886 A1 | 5/2002 | Merkley et al. | |
| 2002/0069791 A1 | 6/2002 | Merkley et al. | |
| 2002/0084046 A1 | 7/2002 | Hsu et al. | |
| 2003/0111197 A1 | 6/2003 | Hu | |
| 2004/0065419 A1 | 4/2004 | Lasmarias et al. | |
| 2004/0112558 A1 | 6/2004 | Garnier et al. | |
| 2004/0112997 A1 | 6/2004 | Matthew et al. | |
| 2004/0149403 A1 | 8/2004 | Rheims et al. | |
| 2004/0180184 A1 | 9/2004 | Fillion et al. | |
| 2004/0241350 A1 | 12/2004 | Koga et al. | |
| 2005/0145348 A1 | 7/2005 | Lee | |
| 2005/0194477 A1 | 9/2005 | Suzuki | |
| 2006/0006264 A1 | 1/2006 | Sabourin et al. | |
| 2007/0164143 A1 | 7/2007 | Sabourin et al. | |
| 2008/0148999 A1 | 6/2008 | Luo et al. | |
| 2008/0227161 A1 | 9/2008 | Levie et al. | |
| 2009/0145562 A1 | 6/2009 | Nguyen | |
| 2009/0145842 A1 | 6/2009 | Frances | |
| 2009/0162602 A1 | 6/2009 | Cottier et al. | |
| 2009/0221812 A1 | 9/2009 | Ankerfors et al. | |
| 2009/0266500 A1 | 10/2009 | Schubert et al. | |
| 2010/0065236 A1 | 3/2010 | Henriksson et al. | |
| 2010/0218908 A1 | 9/2010 | Silenius et al. | |
| 2010/0288456 A1 | 11/2010 | Westland et al. | |
| 2011/0088858 A1 | 4/2011 | Polat et al. | |
| 2011/0277947 A1 | 11/2011 | Hua et al. | |
| 2011/0314726 A1 | 12/2011 | Jameel et al. | |
| 2012/0007363 A1 | 1/2012 | Wang | |
| 2012/0012031 A1 | 1/2012 | Husband et al. | |
| 2012/0241114 A1 | 9/2012 | Axrup et al. | |
| 2012/0277710 A1 | 11/2012 | Marinelli et al. | |
| 2013/0071655 A1 | 3/2013 | Zwick et al. | |
| 2013/0202870 A1 | 8/2013 | Malmborg et al. | |
| 2013/0209749 A1 | 8/2013 | Myangiro et al. | |
| 2013/0248130 A1 * | 9/2013 | Stockhaus | B32B 27/36 162/136 |
| 2014/0057105 A1 | 2/2014 | Pande et al. | |
| 2014/0116635 A1 | 5/2014 | Porto et al. | |
| 2014/0180184 A1 | 6/2014 | Duguid | |
| 2014/0209260 A1 | 7/2014 | Li et al. | |
| 2014/0209264 A1 | 7/2014 | Tirimacco et al. | |
| 2014/0302117 A1 | 10/2014 | Moen et al. | |
| 2015/0299955 A1 | 10/2015 | Laukkanen et al. | |
| 2016/0069029 A1 | 3/2016 | Shannon | |
| 2016/0138224 A1 | 5/2016 | Shannon et al. | |
| 2016/0333524 A1 * | 11/2016 | Pande | D01B 9/00 |
| 2016/0340802 A1 | 11/2016 | Pande et al. | |
| 2017/0058457 A1 | 3/2017 | Marcoccia et al. | |
| 2017/0073893 A1 | 3/2017 | Bilodeau et al. | |
| 2017/0217654 A1 | 8/2017 | Harmon | |
| 2017/0226009 A1 | 8/2017 | Marcoccia et al. | |
| 2017/0369202 A1 * | 12/2017 | Smith | B31B 50/59 |
| 2017/0370036 A1 | 12/2017 | Hermans et al. | |
| 2018/0105986 A1 | 4/2018 | Pande et al. | |
| 2018/0148895 A1 | 5/2018 | Marcoccia et al. | |
| 2019/0218716 A1 | 7/2019 | Hoglund et al. | |
| 2019/0242062 A1 | 8/2019 | Harshad et al. | |
| 2020/0063353 A1 | 2/2020 | Everett et al. | |
| 2020/0308769 A1 * | 10/2020 | Pande | D21H 19/34 |
| 2020/0325629 A1 | 10/2020 | Marcoccia et al. | |
| 2020/0340155 A1 | 10/2020 | Pande et al. | |
| 2021/0207289 A1 | 7/2021 | Pande et al. | |
| 2022/0333312 A1 | 10/2022 | Langford et al. | |
| 2022/0333314 A1 | 10/2022 | Langford et al. | |
| 2022/0356648 A1 | 11/2022 | Pande et al. | |
| 2023/0035105 A1 | 2/2023 | Marcoccia et al. | |
| 2023/0084180 A1 | 3/2023 | Pande et al. | |
| 2023/0350588 A1 | 11/2023 | Trantham et al. | |
| 2023/0366155 A1 | 11/2023 | Zwick et al. | |

FOREIGN PATENT DOCUMENTS

| | | |
|---|---|---|
| CA | 2883161 A1 | 2/2014 |
| CA | 3150203 A1 | 4/2021 |
| CN | 1516768 A | 7/2004 |
| CN | 1718914 A | 1/2006 |
| CN | 101691700 A | 4/2010 |
| CN | 102971462 A | 3/2013 |
| CN | 103590283 B | 12/2015 |
| CN | 108867181 A | 11/2018 |
| CN | 111788057 B | 5/2022 |
| EP | 0333209 A2 | 9/1989 |
| EP | 0333212 A2 | 9/1989 |
| EP | 1232854 A1 | 8/2002 |
| EP | 2191066 A1 | 6/2010 |
| EP | 2220291 A1 | 8/2010 |
| EP | 3108059 B1 | 12/2016 |
| EP | 2888401 B1 | 1/2018 |
| FR | 2520769 A1 | 8/1983 |
| JP | S58136895 A | 8/1983 |
| JP | H02229747 A | 9/1990 |
| JP | 103122038 A | 5/1991 |
| JP | H04194097 A | 7/1992 |
| JP | H04263699 A | 9/1992 |
| JP | H07165456 A | 6/1995 |
| JP | H08197836 A | 8/1996 |
| JP | H08284090 A | 10/1996 |
| JP | H09124950 A | 5/1997 |
| JP | 2002194691 A | 7/2002 |
| JP | 2004525284 A | 8/2004 |

(56) References Cited

FOREIGN PATENT DOCUMENTS

| | | |
|---|---|---|
| JP | 2004360088 A | 12/2004 |
| JP | 2007231438 A | 9/2007 |
| JP | 2010125694 A | 6/2010 |
| JP | 2012526923 A | 11/2012 |
| JP | 2015526608 A | 9/2015 |
| JP | 2018135631 A | 8/2018 |
| KR | 20040022874 A | 3/2004 |
| KR | 10-20050086850 A | 8/2005 |
| KR | 100662043 B1 | 12/2006 |
| KR | 10-2010-0090745 A | 8/2010 |
| KR | 10-20130132381 A | 12/2013 |
| RU | 2224060 C2 | 2/2004 |
| RU | 2309211 C2 | 10/2007 |
| RU | 2358055 C2 | 6/2009 |
| WO | 1996004424 A1 | 2/1996 |
| WO | 1998023814 A1 | 6/1998 |
| WO | 2002014606 A2 | 2/2002 |
| WO | 2002095129 A1 | 11/2002 |
| WO | 2004101889 A2 | 11/2004 |
| WO | 2009014483 A1 | 1/2009 |
| WO | 2009038730 A1 | 3/2009 |
| WO | 2009155541 A2 | 12/2009 |
| WO | 2010134868 A1 | 11/2010 |
| WO | 2012007363 A1 | 1/2012 |
| WO | 2012101331 A1 | 8/2012 |
| WO | 2014031737 A1 | 2/2014 |
| WO | 2014106684 A1 | 7/2014 |
| WO | 2015127233 A1 | 8/2015 |
| WO | 2015127239 A1 | 8/2015 |
| WO | 2017196519 A1 | 11/2017 |
| WO | 2018026804 A1 | 2/2018 |
| WO | 2018051275 A2 | 3/2018 |
| WO | 2019152969 A1 | 8/2019 |
| WO | 2021061723 A1 | 4/2021 |
| WO | 2021061747 A1 | 4/2021 |

OTHER PUBLICATIONS

Korean Notice of Preliminary Rejection in related Korean Patent Application No. KR10-2023-7022380 dated Aug. 21, 2023 with English Translation.
Applicant Initiated Interview Summary for U.S. Appl. No. 13/836,760, dated May 9, 2017.
Applicant Initiated Interview Summary for U.S. Appl. No. 13/836,760, dated Sep. 27, 2017.
Brazilian Notice of Rejection in corresponding Brazilian Patent Application No. 1120150038190 dated May 24, 2022 with English summary.
Brazilian Search Report issued in Corresponding Brazilian Patent Application No. BR112015003819-0, dated Sep. 9, 2019.
Carvalho, et al., "A Comparative Study for Two Automated Techniques for Measuring Fiber length," Tappi Journal, Technical Association of The Pulp & Paper Industry, 80(2): 137-142, 1997.
Declaration of Harshad Pande and Bruno Marcoccia, filed in U.S. Appl. No. 13/836,760, dated Oct. 12, 2016.
Demuner et al., "Ultra Low Intensity Refining of Eucalyptus Pulps." Scientific and Technical Advances in Refining and Mechanical Pulping 2005.
Extended European Search Report issued in European Application No. 17195921.6, mailed Nov. 20, 2017.
Final Office Action issued in U.S. Appl. No. 13/836,760, dated May 12, 2016.
Final Office Action issued in U.S. Appl. No. 13/838,760, dated Jan. 27, 2017.
Handbook of Pulping and Papermaking, C. Biermann, Academic Press; 2nd Edition (Aug. 5, 1996), p. 145.
Intention to grant for European Patent Application No. 13759601.1, dated Jul. 25, 2017, 45 pgs.
International Preliminary Report on Patentability for PCT Application No. PCT/US2013/055971, dated Feb. 24, 2015.
International Preliminary Report on Patentability issued in International Patent Application No. PCT/US2015/016858, dated Aug. 23, 2016.
International Preliminary Report on Patentability issued in International Patent Application No. PCT/US2015/016865, dated Aug. 23, 2016.
International Search Report and Written Opinion dated May 16, 2023 from International Application No. PCT/US2023/060044, International Filing Date Jan. 3, 2023.
International Search Report and Written Opinion for PCT Application No. PCT/US2013/055971, dated Oct. 24, 2013.
International Search Report and Written Opinion from International Application No. PCT/US2020/52179 dated Jan. 29, 2021, International Filing Date Sep. 23, 2020.
International Search Report and Written Opinion from International Application No. PCT/US2020/052138 dated Jan. 18, 2021, International Filing Date Sep. 23, 2020.
International Search Report and Written Opinion from International Application No. PCT/US2020/52146 dated Dec. 8, 2020, International Filing Date Sep. 23, 2020.
International Search Report and Written Opinion issued in International Patent Application No. PCT/US2015/016858, dated May 15, 2015.
International Search Report and Written Opinion issued in International Patent Application No. PCT/US2015/016865, dated May 20, 2015.
International Search Report and written Opinion issued in International Patent Application No. PCT/US2017/044881, dated Oct. 18, 2017.
International Search Report and written Opinion issued in International Patent Application No. PCT/US2017/057161, dated Dec. 22, 2017.
International Search Report and written Opinion issued in International Patent Application No. PCT/US2019/016590, dated May 23, 2019.
International Search Report and written Opinion issued in International Patent Application No. PCT/US2020/025037, dated Jul. 16, 2020.
Joy et al., "Ultra-Low Intensity Refining of Short Fibered Pulps." African Pulp and Paper Week 2004 retrieved from URL:< https://www.tappsa.eo.za/archive2/APPW 2004/Title2004/Ultra- low intensity refining/ultra-low intensity refining html>.
Korean Notice of Preliminary Rejection in corresponding Korean Patent application No. KR10-2022-7024842 dated Aug. 29, 2022 with English Translation.
Lavrykova-Marrain et al., "Characterizing the drainage resistance of pulp and microfibrillar suspensions using hydrodynamic flow measurements," TAPPI's PaperCon 2012 Conference.
Non-Final Office Action for U.S. Appl. No. 13/836,760, dated Oct. 15, 2015.
Notice of Acceptance for Australian Application No. 2013305802, dated Apr. 21, 2017.
Notice of Acceptance for New Zealand Application No. 705191, dated Apr. 13, 2017.
Notice of Allowance for Canadian Patent Application No. 2,883,161, Jan. 3, 2017.
Notice of Grant for Chinese Application No. 201380054919.2, mailed Nov. 14, 2017.
Notice of Reasons for Refusal issued in Japanese Patent Application No. 2018-090071, dated May 15, 2019.
Office Action issued in Corresponding Chinese Patent Application No. 201810081469.0, dated Jan. 21, 2020.
Office Action issued in corresponding European Patent No. 17195921 dated Apr. 17, 2019.
Office Action Issued in Corresponding Korean Patent Application No. 10-2015-7006955, dated May 29, 2020.
Office Action issued in Indian Patent Application No. 465/KOLNP/2015, dated May 7, 2019.
Office Action issued in Russian Patent Application No. 2018125883/12, dated Mar. 6, 2019.
Pal et al., "A Simple Method for Calculation of the Permeability Coefficient of Porous Media," TAPPI Journal, 5(9):10-16, (2006).

(56) References Cited

OTHER PUBLICATIONS

Pala et al., "Refining and Enzymatic Treatment of Secondary Fibres for Paperboard Production: Cyberflex Measurements of Fibre Flexibility" Cost E20—Wood Fibre Cell Wall Structure 2001, 4 pages.
Restriction Requirement for U.S. Appl. No. 13/836,760, dated Jul. 16, 2015.
Smook, Handbook for Pulp and Paper Technologists, 1992, Angus Wilde Publications, 2nd Edition, Chapters 13, 15, 16 and 20 (Year: 1992).
Teixeira, "Recycled Old Corrugated Container Fibers for Wood-Fiber Cement Sheets," International Scholarly Research Network 2012(923413): 1-8, 2012.
Tonoli et al., "Effect of Fibre morphology on flocculation of fibre-cement suspensions," Cement and Concrete Research, 39:1017-1022, (2009).
Invitation to Pay Additional Fees and Where Applicable Protest Fee from International Patent Application No. PCT/US23/60044, dated Mar. 15, 2023.
International Search Report and Written Opinion issued in International Application No. PCT/US2020/028986, dated Jul. 17, 2020.
Liner International Paper, www.Internationalpaper.com/products/asia/containerboard/product-detail/liner-ipad, downloaded on Aug. 3, 2021, 3 pgs., Year 2021.
Norton, Sarilee, Lightweight Containerboard in North America—"Can You Hear Me Now?", Jan./Feb. 2013, PaperAge, pp. 18-21 (Year 2013.
Notice of Allowance Issued in Chinese Patent Application No. 201580020488.7, dated Apr. 8, 2018.
Office Action issued in Japanese Application No. 2016-552985, dated Apr. 10, 2018.
Smook, Handbook for Pulp and Paper Technologists, 1992, Angus Wilde Publications, 2nd Edition, Chapter 9 (Year: 1992).

* cited by examiner

402 — Spray a surface enhanced pulp fiber (SEPF) coating on at least a portion of a molded pulp product, the SEPF coating including SEPF having a length weighted average fiber length that is at least 0.20 millimeters (mm) and an average hydrodynamic specified surface area that is at least 10 square meters per gram ($m^2/g$)

502 — Receive a surface enhanced pulp fiber (SEPF) coating on at least a portion of a molded pulp product, the SEPF coating including SEPF having a length weighted average fiber length that is at least 0.20 millimeters (mm) and an average hydrodynamic specific surface area that is at least 10 square meters per gram ($m^2/g$)

504 — Finish the SEPF coating on the at least a portion of the molded pulp product

*FIG. 5*

MOLDED PULP PRODUCTS INCORPORATING SURFACE ENHANCED PULP FIBERS AND METHODS OF MAKING THE SAME

CROSS-REFERENCE TO RELATED APPLICATIONS

This application is a U.S. National Application of International Patent Application No. PCT/US2020/0054470 filed Oct. 7, 2020 and claims priority to and the benefit of U.S. Provisional Application No. 62/911,896, filed Oct. 7, 2019, the contents of both of which are incorporated into the present application by reference in their entirety.

FIELD OF DISCLOSURE

The present invention relates generally to products made from pulp, the products incorporating surface enhanced pulp fibers.

BACKGROUND

Conventional food packaging products are made from fluorinated chemicals. However, such packaging products are not compostable. With growing demand for more sustainable products from customers, other types of products are being researched and implemented. On more sustainable product is a molded pulp product. For example, pulp, such as wood pulp, may be molded into a three-dimensional (3D) product for food packaging products for foods (e.g., solids, liquids, and semi-solids). However, these molded pulp products may not have sufficient barrier properties to make them as useful as food packaging products as those formed from fluorinated chemicals.

One area of research into molded pulp products includes highly fibrillated fibers. For example, International Patent Application WO 2017/149408 describes 3D articles that are made using a fiber suspension in which at least 50% of the fibers have a length of 1-10 micrometers (μm) (e.g., are highly fibrillated, also referred to as microfibrillated cellulose (MFC)). The articles are made by spraying multiple layers of the fiber suspension into a mold and molding the suspension to form the 3D articles. Additionally, International Patent Application WO 2018/078558 describes plates (e.g., 3D articles) that are formed by spraying a coating of MFC (with a slip aid and a hydrocolloid) on a cellulosic molded article to form the plates without the use of fluorocompounds. Again, the MFC has a length of 1-10 μm, and essentially all of the fibers are fines.

SUMMARY

The present disclosure is related to systems and methods of forming molded pulp products using surface enhanced pulp fibers (SEPF). Pulp may be molded into a three-dimensional article, such as a cup, and after molding (or during a molding process), a SEPF coating may be sprayed on at least a portion of the article (e.g., a molded pulp product). The SEPF coating may include fibers that have a length weighted average fiber length that is at least 0.20 millimeters (mm) and an average hydrodynamic specific surface area that is at least 10 square meters per gram ($m^2/g$). The SEPF coating may impart improved barrier properties to the molded pulp product, as compared to a molded pulp product without the SEPF coating. For example, the SEPF coating may reduce air permeability and/or oil absorption without significantly increasing roughness of the product. Thus, molded pulp products with the SEPF coating may be used as food packaging products (e.g., containers of solids, liquids, or semi-solids), products for protective packaging, building or construction, or products for the military.

Some embodiments of a present method of pulp product manufacture comprise spraying a surface enhanced pulp fiber (SEPF) coating on at least a portion of a molded pulp product. The SEPF coating comprises SEPF having a length weighted average fiber length that is at least 0.20 millimeters (mm) and an average hydrodynamic specific surface area that is at least 10 square meters per gram ($m^2/g$).

In some of the foregoing embodiments, spraying the SEPF coating on the at least a portion of the molded pulp product comprises spraying the SEPF coating on an inner surface of the molded pulp product. Additionally, or alternatively, spraying the SEPF coating on the at least a portion of the molded pulp product comprises spraying the SEPF coating on an outer surface of the molded pulp product. Additionally, or alternatively, spraying the SEPF coating on the at least a portion of the molded pulp product comprises spraying the SEPF coating on an inner surface and an outer surface of the molded pulp product. Additionally, or alternatively, spraying the SEPF coating comprises providing the molded pulp product to one or more nozzles and ejecting the SEPF coating from the one or more nozzles onto the molded pulp product.

In some of the foregoing embodiments, the method further comprises performing a molding process on a layer of pulp to form the molded pulp product. The molding process comprises an injection molding process, a compression molding process, a transfer molding process, an extrusion molding process, a blow molding process, a dip molding process, a rotational molding process, a thermoforming process, a laminating process, a foam molding process, or a combination thereof. Additionally, or alternatively, the method further comprises performing a thermoforming process, a drying process, or both on the molded pulp product after spraying the SEPF coating on the molded pulp product. Additionally, or alternatively, the method further comprises setting a spray time of the SEPF coating to control an amount of the SEPF coating that is deposited on the molded pulp product. In some such embodiments, the spray time is approximately 35 to 90 seconds, and the amount is approximately 90 to 300 grams per square meter ($g/m^2$). Additionally, or alternatively, the spraying is initiated based on a trigger from a photoelectric object sensor.

Some embodiments of a present article of manufacture comprise a molded pulp product. The article of manufacture further comprises a coating layer of surface enhanced pulp fibers (SEPF) disposed on at least a portion of the molded pulp product. The SEPF have a length weighted average fiber length that is at least 0.20 millimeters (mm) and an average hydrodynamic specific surface area that is at least 10 square meters per gram ($m^2/g$).

In some of the foregoing embodiments, the coating layer of SEPF is disposed on an inner surface of the molded pulp product. Alternatively, the coating layer of SEPF is disposed on an outer surface of the molded pulp product. Alternatively, the coating layer of SEPF is disposed on an inner surface and an outer surface of the molded pulp product. Additionally, or alternatively, the molded pulp product with the coating layer of SEPF has a roughness of approximately 4 to 6 micrometers (μm), an air permeability of approximately 0.76 to 1.98 milliliters per minute (ml/min), an oil absorption of approximately 11 to 30 grams per square meter ($g/m^2$), or a combination thereof.

As used herein, various terminology is for the purpose of describing particular implementations only and is not intended to be limiting of implementations. For example, as used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term). The term "coupled" is defined as connected, although not necessarily directly, and not necessarily mechanically; two items that are "coupled" may be unitary with each other. The terms "a" and "an" are defined as one or more unless this disclosure explicitly requires otherwise. The term "substantially" is defined as largely but not necessarily wholly what is specified—and includes what is specified; e.g., substantially 90 degrees includes 90 degrees and substantially parallel includes parallel—as understood by a person of ordinary skill in the art. In any disclosed embodiment, the term "substantially" may be substituted with "within [a percentage] of" what is specified, where the percentage includes 0.1, 1, 5, and 10 percent; and the term "approximately" may be substituted with "within 10 percent of" what is specified. The phrase "and/or" means and or. To illustrate, A, B, and/or C includes: A alone, B alone, C alone, a combination of A and B, a combination of A and C, a combination of B and C, or a combination of A, B, and C. In other words, "and/or" operates as an inclusive or. Additionally, the phrase "A, B, C, or a combination thereof" or "A, B, C, or any combination thereof" includes: A alone, B alone, C alone, a combination of A and B, a combination of A and C, a combination of B and C, or a combination of A, B, and C.

The terms "comprise" and any form thereof such as "comprises" and "comprising," "have" and any form thereof such as "has" and "having," and "include" and any form thereof such as "includes" and "including" are open-ended linking verbs. As a result, an apparatus that "comprises," "has," or "includes" one or more elements possesses those one or more elements, but is not limited to possessing only those elements. Likewise, a method that "comprises," "has," or "includes" one or more steps possesses those one or more steps, but is not limited to possessing only those one or more steps.

Any implementation of any of the apparatuses, systems, and methods can consist of or consist essentially of—rather than comprise/include/have—any of the described steps, elements, and/or features. Thus, in any of the claims, the term "consisting of" or "consisting essentially of" can be substituted for any of the open-ended linking verbs recited above, in order to change the scope of a given claim from what it would otherwise be using the open-ended linking verb. Additionally, it will be understood that the term "wherein" may be used interchangeably with "where."

Further, a device or system that is configured in a certain way is configured in at least that way, but it can also be configured in other ways than those specifically described. Aspects of one example may be applied to other examples, even though not described or illustrated, unless expressly prohibited by this disclosure or the nature of a particular example. Some details associated with the aspects described above and others are described below.

Some details associated with the aspects are described above, and others are described below. Other implementations, advantages, and features of the present disclosure will become apparent after review of the entire application, including the following sections: Brief Description of the Drawings, Detailed Description, and the Claims.

BRIEF DESCRIPTION OF THE DRAWINGS

The following drawings illustrate by way of example and not limitation. For the sake of brevity and clarity, every feature of a given structure is not always labeled in every figure in which that structure appears. Identical reference numbers do not necessarily indicate an identical structure. Rather, the same reference number may be used to indicate a similar feature or a feature with similar functionality, as may non-identical reference numbers.

DETAILED DESCRIPTION OF ILLUSTRATIVE EMBODIMENTS

Figure 1:
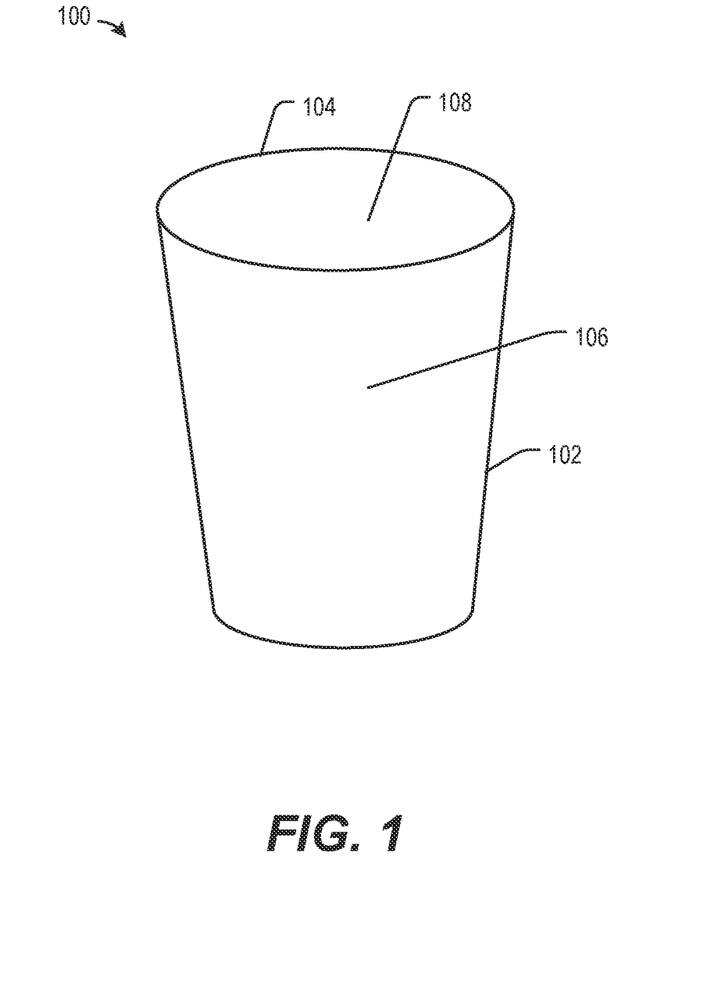
FIG. 1 is perspective view of a molded pulp product.

Referring to FIG. 1, a molded pulp product 100 is shown. Molded pulp product 100 is a three-dimensional (3D) article. In a particular implementation, molded pulp product 100 is a cup. Although described as a cup, in other implementations, molded pulp product 100 may be a plate or another type of food packaging product. In other implementations, molded pulp product 100 is a product for protective packaging, building or construction, or a product for the military.

Molded pulp product 100 may be formed from wood pulp, such as hardwood (e.g., originating from oak, gum, maple, poplar, eucalyptus, aspen, birch, and/or the like) pulp or softwood (e.g., originating from spruce, pine, fir, hemlock, redwood, and/or the like) pulp, or from non-wood pulp (e.g., originating from kenaf, hemp, straws, bagasse, and/or the like). In some implementations, the pulp may include a combination (e.g., a mixture) of hardwood pulp, softwood pulp, and/or non-wood pulp. The pulp may be molded into the shape of the product using one or more molding techniques. For example, the pulp may be molded into the shape of the container using an injection molding process, a compression molding process, a transfer molding process, an extrusion molding process, a blow molding process, a dip molding process, a rotational molding process, a thermoforming process, a laminating process, a foam molding process, or a combination thereof.

Surface enhanced pulp fibers (SEPF) are used to form molded pulp product 100. SEPF may be highly fibrillated fibers, that can be hardwood fibers, softwood fibers, or non-wood fibers. In a particular implementation, the SEPF are hardwood fibers. SEPF can have higher surface areas compared to conventionally-refined fibers, and can be made in a manner that mitigates reductions in fiber length that occur in conventional refining processes. For example, SEPF can have a length weighted average fiber length that is greater than or equal to any one of, or between any two of, 0.20 millimeters (mm), 0.30 mm, 0.40 mm, 0.50 mm, 0.60 mm, 0.70 mm, 0.80 mm, 0.90 mm, 1.0 mm, 1.5 mm, or 2.0 mm (e.g., greater than or equal to 0.20 mm, 0.30 mm, or 0.40 mm or between 1.0 mm and 2.0 mm), and an average hydrodynamic specific surface area that is greater than or equal to any one of, or between any two of, 10 $m^2/g$, 12 $m^2/g$, 14 $m^2/g$, 16 $m^2/g$, 18 $m^2/g$, or 20 $m^2/g$ (e.g., greater than or equal to 10 $m^2/g$ or 12 $m^2/g$). Optionally, the number of SEPF can be at least 12,000 per milligram on an oven-dry basis (e.g., based on a sample of the SEPF that is dried in an oven set at 105° C. for 24 hours). A description of SEPF and processes by which SEPF can be made are set forth in further detail in U.S. patent application Ser. No. 13/836,760, filed Mar. 15, 2013, and published as Pub. No. US 2014/0057105 on Feb. 27, 2014, which is incorporated herein by reference.

At least a portion of molded pulp product 100 is sprayed with a SEPF coating (e.g., a SEPF coating is disposed on at least a portion of the pulp of the product). To illustrate, molded pulp product 100 includes an outer surface 102 and an inner surface 104. In some implementations, molded pulp product 100 includes a first SEPF coating 106 disposed on outer surface 102. In some implementations, molded pulp product 100 includes a second SEPF coating 108 disposed on inner surface 104. In some implementations, molded pulp product 100 includes both first SEPF coating 106 and second SEPF coating 108. SEPF coatings 106-108 may be sprayed on molded pulp product 100 during manufacture, as further described with reference to FIGS. 2 and 3A-B. In a particular implementation, the SEPF coating(s) make up approximately 5-15% of the total weight of molded pulp product 100.

Molded pulp product 100 improves upon conventional molded pulp products. To illustrate, SEPF coatings 106-108 may impart improved barrier properties. For example, SEPF coatings 106-108 may reduce air permeability and/or oil absorption of molded pulp product 100 (as compared to if molded pulp product 100 did not include SEPF coatings 106-108). Improving the barrier properties of molded pulp product 100 may make molded pulp product 100 more suitable for use as a food or protective packaging product, as a non-limiting example. For example, the improved barrier properties may be similar to those of a product made using fluorinated chemicals. However, molded pulp product 100 may be compostable, which may be more desirable to customers. Thus, molded pulp product 100 may replace food packaging products formed with fluorinated chemicals, providing a compostable food packaging product with desired barrier properties for food packaging.

Figure 2:
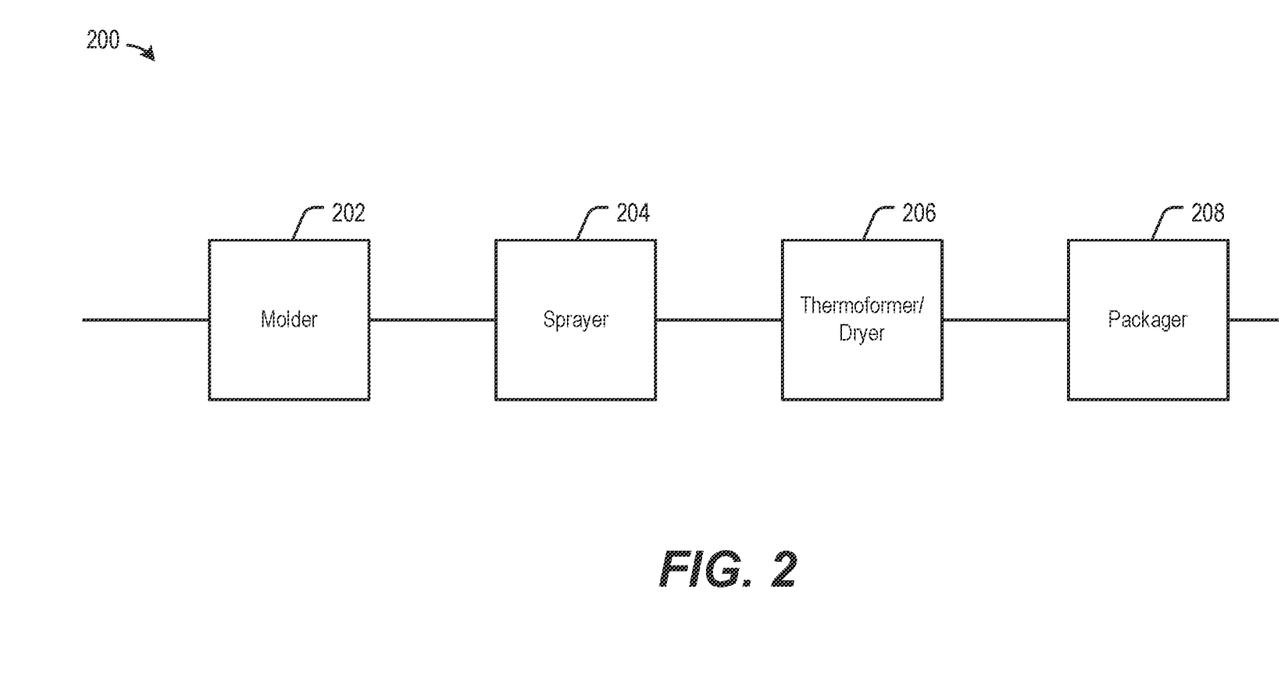
FIG. 2 is a block diagram of a first implementation of a system to manufacture molded pulp products.

Referring to FIG. 2, a system for manufacturing molded pulp products is shown and designated 200. In a particular implementation, system 200 is used to manufacture molded pulp product 100 of FIG. 1. In other implementations, system 200 is used to manufacture cups, plates, containers, other food packaging products, protective packaging, building or construction materials, or other molded pulp products.

System 200 includes a molder 202, a sprayer 204 coupled to molder 202, a thermoformer/dryer 206 coupled to the sprayer 204, and a packager 208 coupled to thermoformer/dryer 206. In other implementations, system 200 may include fewer or more components than illustrated in FIG. 2.

Molder 202 may be configured to receive pulp and to mold the pulp into one or more molded pulp products. For example, molder 202 may be configured to perform an injection molding process, a compression molding process, a transfer molding process, an extrusion molding process, a blow molding process, a dip molding process, a rotational molding process, a thermoforming process, a laminating process, a foam molding process, or a combination thereof, to mold the pulp into the shapes of the one or more molded pulp products. In a particular implementation, molder 202 may mold the pulp into the shape of food packages, such as cups or plates. In other implementations, molder 202 may mold the pulp into other shapes. In other implementations, additional processes may be performed, such as forming processes (e.g., pressing, bending, shearing, and others), machining processes (e.g., turning, drilling, shaping, planning, sharpening, finishing, and others), and/or additive manufacturing processes (e.g., 3D printing and others).

The pulp may be mixed prior to being provided to molder 202. For example, a mixer may mix one type of pulp with another type of pulp. As an example, the mixer may mix hardwood pulp with softwood pulp. As another example, the mixer may mix softwood pulp with non-wood pulp. Additionally, the mixer may mix the pulp with one or more additives. Further, the mixer may mix the pulp with water to hydrate the pulp into a moldable form. Thus, in some implementations, system 200 may include a mixer coupled to an input of molder 202. In some implementations, the pulp is 100% Maple virgin pulp pads of approximately 600 $g/m^2$ with no prior addition of oil barrier chemicals. In other implementations, the pulp may be other types of pulp.

In a particular implementation, molder 202 includes a first mold and a second mold. The first mold (or the second mold) may include small holes for drying purposes. The pulp may be disposed on the first mold, and the second may be pressed against the first mold to give shape to the pulp. As the second mold is pressed against the first mold, a vacuum may be applied to the first mold (or the second mold) to further shape the pulp and to dry the pulp. The shaped pulp may then be heated to further dry the pulp, forming the one or more molded pulp products.

Sprayer 204 may be configured to receive the one or more molded pulp products from molder 202 and to spray a SEPF coating on the one or more molded pulp products. The SEPF may be made of hardwood, softwood, non-wood, or a combination thereof. In a particular implementation, the SEPF is 100% Maple SEPF 800 Kwh/t with SEPF consistency of 2%. In a particular implementation, sprayer 204 may be configured to spray the SEPF coating on an inner surface of the one or more molded pulp products, as further described with reference to FIG. 3A. In another particular implementation, sprayer 204 may be configured to spray the SEPF coating on an outer surface of the one or more molded pulp products, as further described with reference to FIG. 3B. In another particular implementation, sprayer 204 may be configured to spray the SEPF coating on the inner surface and the outer surface of the one or more molded pulp products (e.g., a combination of FIGS. 3A and 3B). Spraying the SEPF coating on the one or more molded pulp products may dispose (e.g., form) SEPF coatings on the one or more molded pulp products. Because the one or more molded pulp products have a SEPF coating, the one or more molded pulp products may have improved barrier properties, such as air permeability and oil absorption, as compared to molded pulp products that are formed without the SEPF coating(s). In a particular implementation, molded pulp product 100 (with the SEPF coating) has a roughness of approximately 4 to 6 micrometers (μm), an air permeability of approximately 0.76 to 1.98 millimeters per minute (ml/min), an oil absorption of approximately 11 to 30 grams per square meter ($g/m^2$), or a combination thereof.

In a particular implementation, a spray time may be set for the spraying of the SEPF coating to control an amount of the SEPF coating that is deposited. For example, a controller of sprayer 204 (or a controller of system 200) may be configured to set a time that sprayer 204 sprays the SEPF coating on molded pulp product 100. In a particular implementation, the spray time may be set between approximately 35 to 90 seconds, which may correspond to depositing approximately 90 to 300 g/m² of SEPF on molded pulp product 100.

In some implementations, sprayer 204 may include a photoelectric sensor. The photoelectric sensor may be configured to detect when molded pulp product 100 is within a certain location and, when detected, send a trigger to sprayer 204 to initiate spraying of the SEPF coating on molded pulp product 100. The photoelectric sensor may also send a trigger to stop the spraying of the SEPF coating (or the SEPF coating spray may be stopped after a particular amount of time).

In a particular implementation, sprayer 204 includes two model 1550+ Autojet® Modular Spray systems. Each of the spray systems may be independently configured. Each of the spray systems includes an integrated, air-operated diaphragm pump (e.g., food contact version PU00DP10BSTXP) for continuously run SEPF spray application. In this implementation, the air-operated diaphragm pumps are rated at 2 grams per meter (gpm) at 40 psi (7.5 liters/minute at 2.8 bar) based on water and are rated for a fluid viscosity up to 2000 centipoise (cP). The SEPF liquid suspension may be drawn from a bucket or other container, and SEPF liquid from the system can be recirculated back to the supply container. The spray systems control panel provides on/off and timing control of electrically actuated spray nozzles (e.g., not pressure control). In this implementation, the operating SEPF liquid suspension pressure is 80 psi and the SEPF liquid temperature can vary from 0° to 60° C. In this implementation, the spray system includes two electrically actuated (e.g., hydraulic) nozzles to spray the SEPF coating, each of which can be mounted and operated independently of each other. Each of the nozzles are controlled by the control system and have a recirculation circuit to the supply container. Non-limiting examples of nozzles that can be used include Pulsajet® AA10000AUH-30, Pulsajet AA10000-115630, Pulsajet 10000AUH-03, Pulsajet 10000AUH-10, Pulsajet 10000AUH-104210, Pulsajet 10000JJAU, and Pulsajet 10000JAU-10 nozzles. Additionally, non-limiting examples of spray tips that can be used include Spray tip TPU9501U-SS, Spray tip TPU9501E-SS, and Spray tip TG-SS0.5.

Thermoformer/dryer 206 may be configured to receive the one or more molded pulp products (with the SEPF coating(s)) from sprayer 204 and to perform a thermoforming process, a drying process, or both, on the one or more molded pulp products. For example, the one or more molded pulp products may be heated to a pliable forming temperature and further shaped (using one or more molds) before being cooled in a final shape. In some implementations, thermoformer/dryer 206 is configured to perform hot pressing, for example using a temperature of 180° C. and a force of approximately 1000 pounds (lbs.), as a non-limiting example. Additionally, or alternatively, the one or more molded pulp products may be dried (e.g., via vacuum, heating, air drying, radiofrequency or microwaves drying, or a combination thereof) by thermoformer/dryer 206.

Packager 208 may be configured to receive the one or more molded pulp products (with the SEPF coatings) from thermoformer/dryer 206. Packager 208 may also be configured to package the one or more molded pulp products. For example, packager 208 may stack multiple molded pulp containers on top of each other inside a box, bag, or other package for shipping. Prepared packages may be output by packager 208.

During operation of system 200, pulp received by molder 202 is molded into a 3D shape to form one or more molded pulp products (e.g., molded pulp product 100). Sprayer 204 sprays a SEPF coating on the one or more molded pulp products (e.g., on an interior surface, on an exterior surface, or both). Thermoformer/dryer 206 performs a thermoforming process, a drying process, or both on the one or more molded pulp products (with the SEPF coating), and packager 208 packages the one or more molded pulp products.

A detailed description of a particular set of operations is described below. The description is for illustration only, and is not intended to be limiting. In some implementations, one or more of the operations described may be omitted (or performed in a different order). At the beginning of the operations, an SEPF operation is performed. The SEPF is prepared according to U.S. patent application Ser. No. 13/836,760. Next, operations to prepare a SEPF slurry are performed. For example, an SEPF slurry is agitated following a predefined intensity pattern. A drainage aid is added to the SEPF slurry according to a predefined recipe. A water removal adjuvant is added to the SEPF slurry according to a predefined recipe. The SEPF slurry is prepared to a dryness that can vary from 1% to 30% dry consistency and then added to a reservoir of a spraying system.

Next, operations for surface spraying of the SEPF slurry onto 3D-shaped cellulosic (e.g., pulp) products are performed. For example, a mesh screen from 20-300 mesh is sourced and 3D shaped. The screen is chosen to maximize cellulosic fiber retention and to minimize drainage time of the 3D shaped cellulosic product. Vacuum assisted molding is performed through the 3D shaped mesh screen to mold a 3D shaped cellulosic product. The molding time of the 3D shaped cellulosic product can be set from 1 to 300 seconds according to a predefined time variation pattern that is dependent on the physical properties of the 3D shaped cellulosic product. Drainage of the 3D shaped cellulosic product is done using a combination of vacuum and different heating processes to reach a dryness varying from 2-95%. Pre-drying of the 3D shaped cellulosic product is done using a combination of vacuum and different heating processes (convective or direct drying, indirect or contact drying, radiofrequency or microwaves) for a duration of 1-300 seconds. One or more industrial-scale spraying systems are installed on the proximity of an industrial scale pulp thermoforming machine, and the spraying nozzles are installed facing the cellulosic 3D shaped molded product. After the cellulosic product is formed into a 3D shape and after the dryness of the 3D shaped cellulosic product is 2-95%, the SEPF spraying is automatically initiated using a triggering sensor and the spraying is automatically stopped after a duration from 1-60 seconds. Vacuum is used for a duration varying from 1-300 seconds to increase the dryness of the SEPF sprayed 3D shaped cellulosic product to a dryness varying from 2-95%. Drainage of the SEPF sprayed 3D shaped cellulosic product is done using a combination of vacuum and different heating processes. Pre-drying of the SEPF sprayed 3D shaped cellulosic product is done using a combination of vacuum and different heating processes (convective or direct drying, indirect or contact drying, radiofrequency or microwaves) for a duration from 1-300 seconds.

Next, operations to transfer the 3D shaped SEPF coated material are performed. For example, transfer of the SEPF sprayed 3D shaped cellulosic product onto the thermoforming station of the industrial cellulosic pulp thermoforming machine is done automatically using a combination of vacuum and different heating processes.

Next, operations to thermoform the 3D shaped SEPF coated material are performed. For example, thermoforming of the SEPF sprayed 3D shaped cellulosic product is automatically done using a combination of vacuum and heating. The temperature of the thermoforming tools for the SEPF sprayed 3D shaped cellulosic products vary from 60° to 300° C. following a predefined temperature variation pattern that is dependent on the physical properties of the SEPF sprayed 3D shaped cellulosic product. The vacuum intensity of the thermoforming tooling of the SEPF sprayed 3D shaped cellulosic product is set from 14 inches mercury (Hg) to 28 inch Hg following a predefined vacuum variation pattern. The dwell distance (pressing) between the thermoforming tooling of the SEPF sprayed 3D shaped cellulosic material is set from 100 μm to 500 mm following a predefined dwell distance variation pattern. The thermoforming time of the SEPF sprayed 3D shaped cellulosic product for each dwell distance can be set from 1 to 300 seconds following a predefined time variation pattern that is dependent on the physical properties and requirements of the SEPF sprayed 3D shaped material.

In some implementations, molding, transfer, and thermoforming tools used by system 200 may enable enhanced performance. For example, a molding tool may be formed by a 3D shaped mesh. Strategic positioning and sizing of suction holes in the molding tool enable vacuum forming of a molded pulp product. The molding tool may be formed from highly closed mesh (e.g., up to 300 mesh) in shapes that correspond to the shapes of the molded pulp products. While the molded pulp products are in the molding tool, the SEPF coating may be sprayed on the interior of the surface of the molded pulp product. As another example, a transfer tool may be configured not to damage the integrity of the SEPF coating (e.g., layer) due to strategic positioning of suction/ejection holes on the transfer tool. The transfer tool may enable automatic transfer of the molded pulp product (with the SEPF coating) to a bottom thermoforming tool. As another example, a bottom thermoforming tool may be configured to avoid damage to the low porosity SEPF coating (e.g., layer) because of the non-contact between the bottom thermoforming tool and the SEPF coating (e.g., the inner surface of the molded pulp product). The bottom thermoforming tool may be used in conjunction with a top thermoforming tool to perform water vapor extraction from the molded pulp product during hot pressing (e.g., heating of the molded pulp product and pressing of the molded pulp product). The top thermoforming tool may have an extremely shiny and smooth surface to avoid damaging the low porosity SEPF coating (e.g., layer) when in contact with the SEPF coating.

Figure 3A:
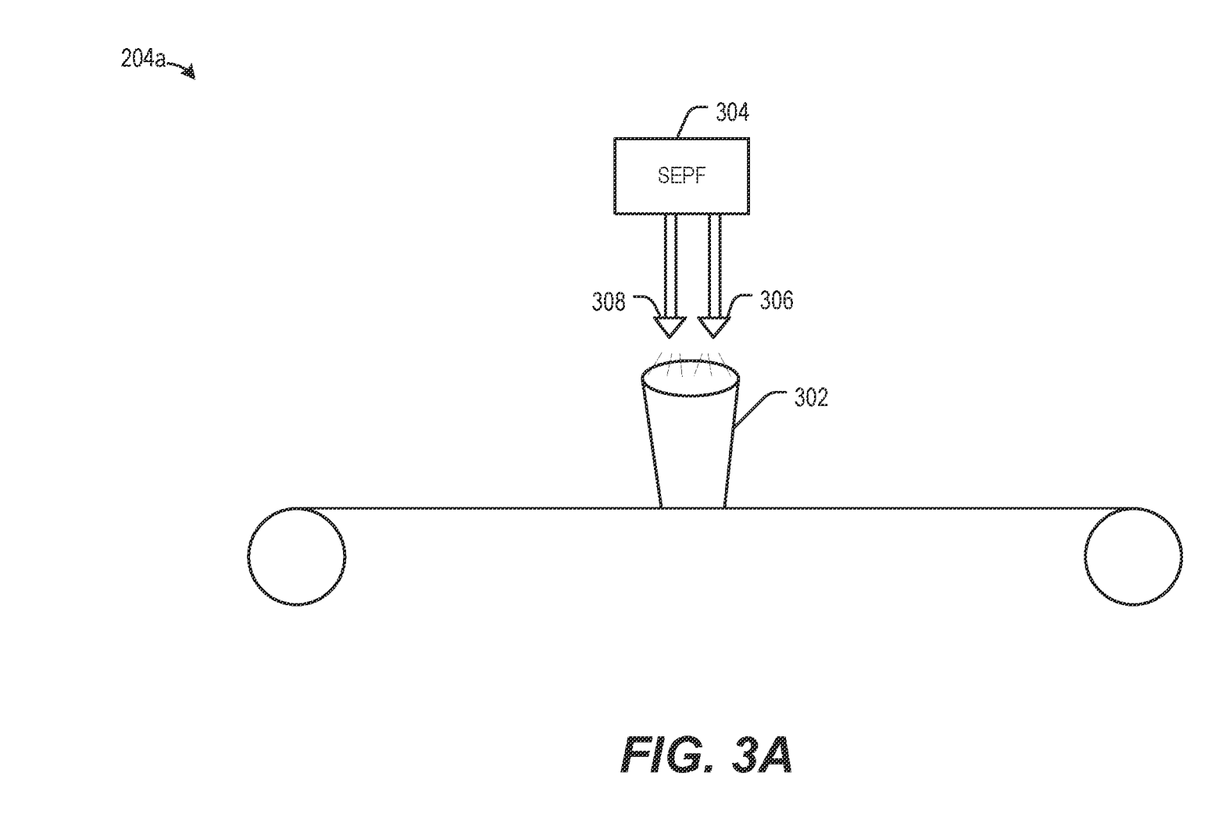
FIG. 3A is a diagram of a first implementation of a sprayer included the system of FIG. 2.
Figure 3B:
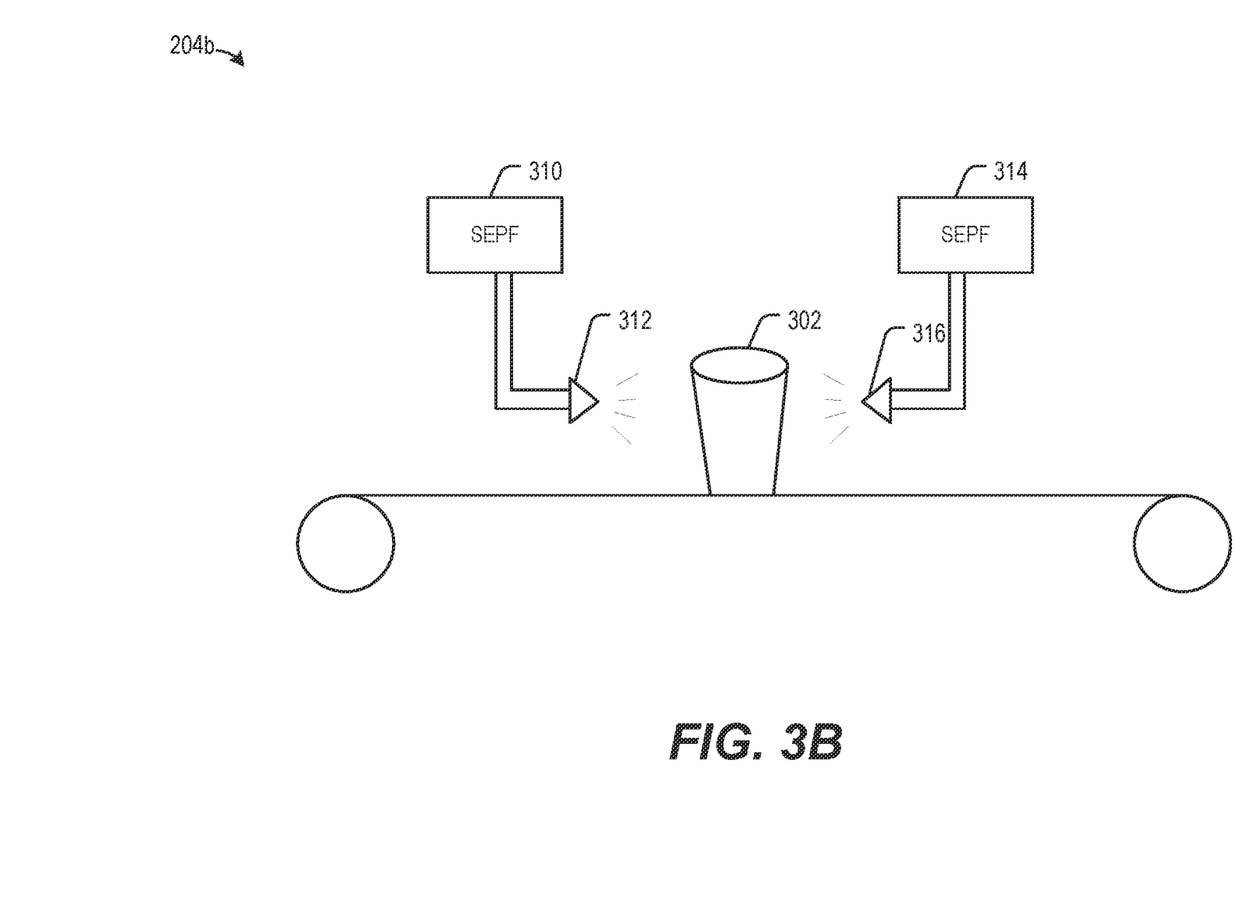
FIG. 3B is a diagram of a second implementation of a sprayer included in the system of FIG. 2.

Referring to FIGS. 3A and 3B, implementations of sprayer 204 of FIG. 2 are shown. The implementations are configured to cover various surfaces of a molded pulp product with a SEPF coating by spraying the SEPF on the molded pulp container.

Referring to FIG. 3A, a first implementation of sprayer 204 of FIG. 2 is shown and designated 204a. Sprayer 204a may be configured to spray a SEPF coating on an inner surface of a molded pulp product 302. In a particular implementation, the molded pulp product 302 includes or corresponds to the molded pulp product 100 of FIG. 1.

Molded pulp product 302 may travel down a conveyer belt (or other apparatus of conveyance) to sprayer 204a. Although illustrated as being provided by itself, in other implementations, molded pulp product 302 may be in a mold or transfer container when provided to sprayer 204a. Sprayer 204a includes a spraying device. Although a single spraying device is shown, in other implementations, sprayer 204a includes more than one spraying device. The spraying device includes a reservoir 304 connected to a first nozzle 306 by a first conduit and to a second nozzle 308 by a second conduit. Although two nozzles are shown, in other implementations, the spraying device may include a single nozzle or more than two nozzles. Reservoir 304 is configured to store SEPF to be sprayed via first nozzle 306 and second nozzle 308.

First nozzle 306 and second nozzle 308 are configured to spray a SEPF coating on the inner surface of molded pulp product 302. In a particular implementation, the spraying device is fixed in a position that covers an entirety of the inner surface of molded pulp product 302 with a SEPF coating. In other implementations, the spraying device is configured to rotate around an interior of molded pulp product 302 to cover the inner surface of molded pulp product 302 with a SEPF coating. After the inner surface of molded pulp product 302 is covered in a SEPF coating, molded pulp product 302 may be conveyed from sprayer 204a (e.g., to thermoformer/dryer 206).

Referring to FIG. 3B, a second implementation of sprayer 204 of FIG. 2 is shown and designated 204b. Sprayer 204b may be configured to spray a SEPF coating on an outer surface of molded pulp product 302.

Molded pulp product 302 may travel down a conveyer belt (or other apparatus of conveyance) to sprayer 204b. Although illustrated as being provided by itself, in other implementations, molded pulp product 302 may be in a mold or transfer container when provided to sprayer 204b. Sprayer 204b includes a first spraying device and a second spraying device. Although two spraying devices are shown, in other implementations, sprayer 204b includes a single spraying device or more than two spraying devices. The first spraying device includes a first reservoir 310 connected to a first nozzle 312 by a first conduit. The second spraying device includes a second reservoir 314 connected to a second nozzle 316 by a second conduit. First reservoir 310 and second reservoir 314 are configured to store SEPF to be sprayed via first nozzle 312 and second nozzle 316, respectively.

First nozzle 312 is configured to spray a SEPF coating on a first side of the outer surface of molded pulp product 302. Second nozzle 316 is configured is configured to spray a SEPF coating on a second side of the outer surface of molded pulp product 302. In a particular implementation, the first spraying device and the second spraying device are fixed in positions that cover an entirety of the outer surface of molded pulp product 302 with a SEPF coating. In other implementations, first spraying device and second spraying device are configured to rotate around molded pulp product 302 to cover the outer surface of molded pulp product 302 with a SEPF coating. For example, the first spraying device and the second spraying device may be coupled to a carousel (or other component for rotation). After the outer surface of molded pulp product 302 is covered in a SEPF coating, molded pulp product 302 may be conveyed from sprayer 204b (e.g., to thermoformer/dryer 206). Although molded pulp product 302 is illustrated with its opening face up, in other implementations, molded pulp product 302 may be conveyed with the opening face down such that the SEPF coating is also sprayed on the bottom of the outer surface of molded pulp product 302.

In some implementations, sprayer 204 includes a combination of sprayer 204a and sprayer 204b. For example, sprayer 204 may include the spraying device of sprayer 204a to spray the inner surface of molded pulp product 302, and sprayer 204 may also include the first spraying device and the second spraying device of sprayer 204b to spray the outer surface of molded pulp product 302. In other implementations, one or more spraying devices may be configured to perform both functions (e.g., to spray SEPF on the outer surface and the inner surface of molded pulp product 302).

Figure 4:
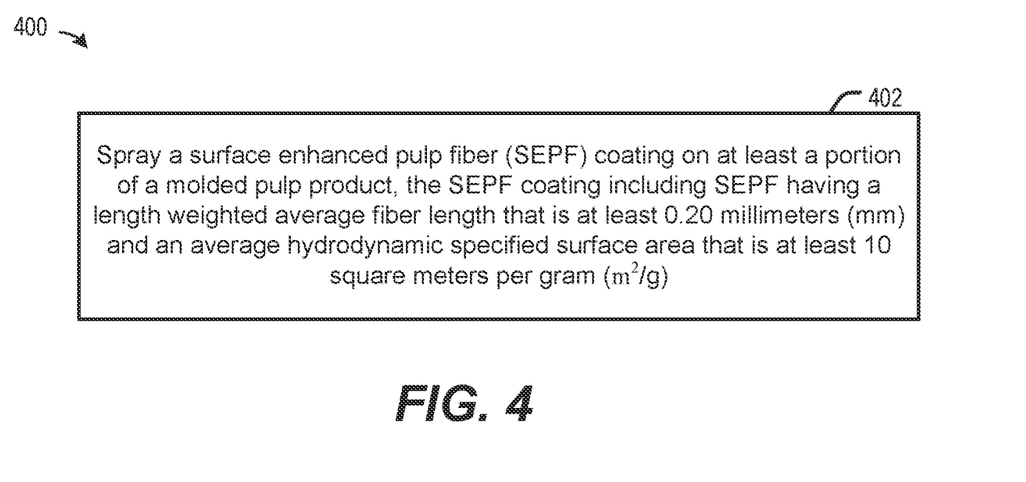
FIG. 4 is a flow diagram of a method of manufacturing a molded pulp product in accordance with a first implementation of this disclosure.

FIG. 4 illustrates a first implementation of a method 400 for molded pulp container manufacture. In a particular implementation, method 400 may be performed by system 200 (or one or more components thereof).

Method 400 includes spraying a surface enhanced pulp fiber (SEPF) coating on at least a portion of a molded pulp product, at 402. The SEPF coating includes SEPF having a length weighted average fiber length that is at least 0.20 millimeters (mm) and an average hydrodynamic specified surface area that is at least 10 square meters per gram ($m^2/g$). For example, sprayer 204 may spray a SEPF coating on molded pulp product 100 and/or molded pulp product 302.

In a particular implementation, spraying the SEPF coating on the at least a portion of the molded pulp product includes spraying the SEPF coating on an inner surface of the molded pulp product. For example, sprayer 204a may spray the SEPF coating on the inner surface of molded pulp product 100 and/or molded pulp product 302. Additionally, or alternatively, spraying the SEPF coating on the at least a portion of the molded pulp product includes spraying the SEPF coating on an outer surface of the molded pulp product. For example, sprayer 204b may spray the SEPF coating on the outer surface of molded pulp product 100 and/or molded pulp product 302. Additionally, or alternatively, spraying the SEPF coating on the at least a portion of the molded pulp product includes spraying the SEPF coating on an inner surface and an outer surface of the molded pulp product. For example, sprayers 204a and 204b may spray the SEPF coating on the inner surface and the outer surface of molded pulp product 100 and/or molded pulp product 302.

In a particular implementation, method 400 further includes performing a molding process on a layer of pulp to form the molded pulp product. The molding process includes an injection molding process, a compression molding process, a transfer molding process, an extrusion molding process, a blow molding process, a dip molding process, a rotational molding process, a thermoforming process, a laminating process, a foam molding process, or a combination thereof. For example, molder 202 may perform a molding process on a layer of pulp to form the molded pulp product. Additionally, or alternatively, method 400 further includes performing a thermoforming process, a drying process, or both on the molded pulp product after spraying the SEPF coating on the molded pulp product. For example, thermoformer/dryer 206 may perform a thermoforming process, a drying process, or both on molded pulp product 100 and/or molded pulp product 302 after the SEPF coating is sprayed on by sprayer 204.

In a particular implementation, method 400 further includes setting a spray time of the SEPF coating to control an amount of the SEPF coating that is deposited on the molded pulp product. For example, sprayer 204 (or a controller) may set a spray time for the SEPF coating. In some such implementations, the spray time is approximately 35 to 90 seconds, and the amount is approximately 90 to 300 $g/m^2$. Additionally, or alternatively, the spraying is initiated based on a trigger from a photoelectric object sensor. For example, sprayer 204 may include a photoelectric object sensor that detects when molded pulp product 100 and/or molded pulp product 302 is in a particular location (e.g., within range of sprayer 204).

Method 400 thus forms (e.g., manufactures) a SEPF-coated molded pulp product. Because the molded pulp product is coated in SEPF, the molded pulp product may have improved barrier properties, such as air permeability and oil absorption, as compared to other molded pulp products. Thus, the molded pulp product formed by method 400 may be more suitable for use as food packaging, protective packaging, or building materials, as compared to conventional molded pulp products.

Figure 5:
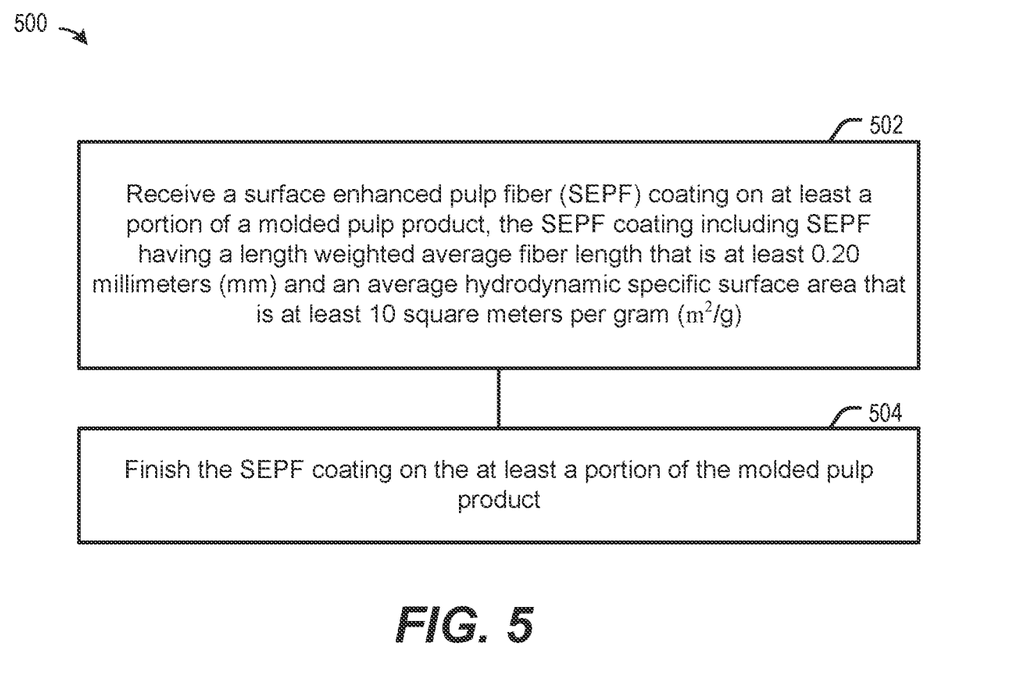
FIG. 5 is a flow diagram of a method of manufacturing a molded pulp product in accordance with a second implementation of this disclosure.

FIG. 5 illustrates a second implementation of a method 500 for molded pulp container manufacture. In a particular implementation, method 500 may be performed by molded pulp product 100 and/or molded pulp product 302.

Method 500 includes receiving a surface enhanced pulp fiber (SEPF) coating on at least a portion of a molded pulp product, at 502. The SEPF coating includes SEPF having a length weighted average fiber length that is at least 0.20 millimeters (mm) and an average hydrodynamic specific surface area that is at least 10 square meters per gram ($m^2/g$). For example, molded pulp product 100 and/or molded pulp product 302 may receive a SEPF coating by having sprayer 204 spray the SEPF coating.

Method 500 further includes finishing the SEPF coating on the at least a portion of the molded pulp product, at 504. For example, thermoformer/dryer 206 may apply contact pressure with a heated and very smooth surface tooling to molded pulp product 100 and/or molded pulp product 302 to finish the SEPF coating on molded pulp product 100 and/or molded pulp product 302. Finishing the SEPF coating may "activate" the oil barrier potential of the SEPF coating due to the combination of the surface smoothness and absence of holes of a thermoforming tooling that comes into contact with the SEPF coated surface, heat, pressure, and removal of SEPF water vapor by vacuum from the opposite side of the smooth surface (e.g., all in one "finishing" operation).

Method 500 thus forms (e.g., manufactures) a SEPF-coated molded pulp product. Because the molded pulp product is coated in SEPF, the molded pulp product may have improved barrier properties, such as air permeability and oil absorption, as compared to other molded pulp products. Thus, the molded pulp product formed by method 400 may be more suitable for use as food packaging, protective packaging, or building materials, as compared to conventional molded pulp products.

In some implementations, method 400 and/or method 500 may be performed by a processor executing instructions stored on a non-transitory computer-readable storage device. For example, system 200 may include a controller that includes a processor and a memory. The controller may be configured to enable the components of the respective system to perform the operations described herein. In some implementations, the controller may be distributed across one or more components of the respective system. The controller may be configured to execute instructions stored at the memory (or at a separate storage device) to perform the operations of the methods 400 and/or 500.

EXAMPLES

The present disclosure will be described in greater detail by way of specific examples. The following examples are offered for illustrative purposes only and are not intended to limit the present disclosure in any manner. Those skilled in the art will readily recognize a variety of non-critical parameters that can be changed or modified to yield essentially the same results.

Control Group 1

Control group 1 represents samples that did not have a SEPF coating sprayed on the samples. The pulp used for all of the following examples (control groups and examples) was 100% Maple virgin pulp pads of 600 g/m². For control group 1, the samples (e.g., pulp products) were molded but not hot pressed. Table 1 sets forth the results of the SEPF (zero in this case, since no SEPF coating was applied), Parker Print-Surf (PPS) roughness, PPS air permeability, and oil absorption of the two samples. In a particular implementation, the roughness and air permeability may be tested using a PPS testing device at standard temperature (e.g., room temperature) and at 2000 kilopascals (kPa). The oil absorption may be tested using 10 ml of vegetable oil (e.g., 50% canola, 50% sunflower) at 55° C. oil temperature for 10 minutes of contact time. In a particular implementation, the oil absorption may be tested in accordance with ASTM D281-12(2016), which is incorporated herein by reference. Additionally, 3D optical surface profiling demonstrated the presence of large cavities in the samples.

TABLE 1

Properties of Control Samples Without Spraying SEPF-Molded But Not Hot Pressed

| Sample | SEPF | PPS Roughness | PPS Air Permeability | Oil Absorption |
|---|---|---|---|---|
| #Q | 0 g/m² | 10.61 ± 1.15 μm | 543.4 ± 4.2 ml/min | 797 g/m² |
| #R | 0 g/m² | 10.15 ± 0.54 μm | 545.4 ± 3.15 ml/min | 842 g/m² |

Control Group 2

Control group 2 represents samples that did not have a SEPF coating sprayed on the samples. For control group 2, the samples (e.g., pulp products) were molded and hot pressed. The hot pressing method was performed at a temperature of 180° C. and a force of 1000±150 lbs. Table 2 sets forth the results of the SEPF (zero in this case, since no SEPF coating was applied), PPS roughness, PPS air permeability, and oil absorption of the two samples. Additionally, 3D optical surface profiling demonstrated the presence of numerous relatively small cavities in the samples. As can be seen from the results in Table 2, there is a significant drop in roughness, air permeability, and oil absorption due to the hot pressing (e.g., as compared to control group 1).

TABLE 2

Properties of Control Samples Without Spraying SEPF-Molded and Hot Pressed

| Sample | SEPF | PPS Roughness | PPS Air Permeability | Oil Absorption |
|---|---|---|---|---|
| #O | 0 g/m² | 4.56 ± 0.05 μm | 158.67 ± 6.7 ml/min | 375 g/m² |
| #P | 0 g/m² | 4.52 ± 0.02 μm | 145.53 ± 3.2 ml/min | 360 g/m² |

Example 1

Example 1 represents samples that had a SEPF coating sprayed on the samples, and that were molded and hot pressed. For example 1, the samples (e.g., pulp products) were sprayed with approximately 90-110 g/m² of SEPF (e.g., the samples were sprayed for approximately 35 seconds). Table 3 sets forth the results of the SEPF, PPS roughness, PPS air permeability, and oil absorption of the two samples. Additionally, 3D optical surface profiling demonstrated that the SEPF covered the surface cavities between fibers. As can be seen from the results in Table 3, there is a significant drop in air permeability and oil absorption with an insignificant change in roughness as compared to control group 2.

TABLE 3

Properties of Example 1

| Sample | SEPF | PPS Roughness | PPS Air Permeability | Oil Absorption |
|---|---|---|---|---|
| #C | 107 g/m² | 5.87 ± 1.2 μm | 1.98 ± 0.22 ml/min | 21.03 g/m² |
| #E | 89 g/m² | 4.54 ± 0.1 μm | 1.69 ± 0.24 ml/min | 29.48 g/m² |

Example 2

Example 2 represents samples that had a SEPF coating sprayed on the samples, and that were molded and hot pressed. For example 2, the samples (e.g., pulp products) were sprayed with approximately 130-180 g/m² of SEPF (e.g., the samples were sprayed for approximately 48 seconds). Table 4 sets forth the results of the SEPF, PPS roughness, PPS air permeability, and oil absorption of the two samples. Additionally, 3D optical surface profiling demonstrated that the SEPF covered the surface cavities between fibers. As can be seen from the results in Table 4, there is a significant drop in air permeability and oil absorption with an insignificant change in roughness as compared to control group 2.

TABLE 4

Properties of Example 2

| Sample | SEPF | PPS Roughness | PPS Air Permeability | Oil Absorption |
|---|---|---|---|---|
| #K | 150 g/m² | 4.47 ± 0.11 μm | 0.81 ±0.09 ml/min | 11.57 g/m² |
| #L | 175 g/m² | 4.64 ± 0.48 μm | 0.84 ± 0.00 ml/min | 11.77 g/m² |
| #M | 179 g/m² | 4.43 ± 0.12 μm | 0.82 ± 0.08 ml/min | 13.32 g/m² |
| #N | 129 g/m² | 4.47 ± 0.27 μm | 1.12 ± 0.07 ml/min | 14.70 g/m² |

Example 3

Example 3 represents samples that had a SEPF coating sprayed on the samples, and that were molded and hot pressed. For example 3, the samples (e.g., pulp products) were sprayed with approximately 180-300 g/m² of SEPF (e.g., the samples were sprayed for approximately 60-90 seconds). Table 5 sets forth the results of the SEPF, PPS roughness, PPS air permeability, and oil absorption of the two samples. Additionally, 3D optical surface profiling demonstrated that the SEPF covered the surface cavities between fibers. As can be seen from the results in Table 5, there is a significant drop in air permeability and oil absorption with an insignificant change in roughness as compared to control group 2.

TABLE 5

Properties of Example 3

| Sample | SEPF | PPS Roughness | PPS Air Permeability | Oil Absorption |
|---|---|---|---|---|
| #S | 179 g/m² | 4.73 ± 0.05 μm | 1.00 ± 0.09 ml/min | 11.29 g/m² |
| #T | 195 g/m² | 4.64 ± 0.10 μm | 0.76 ± 0.02 ml/min | 14.37 g/m² |
| #U | 186 g/m² | 4.85 ± 0.21 μm | 0.90 ± 0.04 ml/min | 11.81 g/m² |

TABLE 5-continued

Properties of Example 3

| Sample | SEPF | PPS Roughness | PPS Air Permeability | Oil Absorption |
|---|---|---|---|---|
| #V | 186 g/m² | 4.39 ± 0.19 µm | 1.07 ± 0.21 ml/min | 12.67 g/m² |
| #W | 295 g/m² | 5.46 ± 0.10 µm | 0.86 ± 0.02 ml/min | 12.8 g/m² |

The above specification and examples provide a complete description of the structure and use of illustrative implementations. Although certain examples have been described above with a certain degree of particularity, or with reference to one or more individual examples, those skilled in the art could make numerous alterations to the disclosed implementations without departing from the scope of this invention. As such, the various illustrative implementations of the methods and systems are not intended to be limited to the particular forms disclosed. Rather, they include all modifications and alternatives falling within the scope of the claims, and examples other than the one shown may include some or all of the features of the depicted example. For example, elements may be omitted or combined as a unitary structure, and/or connections may be substituted. Further, where appropriate, aspects of any of the examples described above may be combined with aspects of any of the other examples described to form further examples having comparable or different properties and/or functions, and addressing the same or different problems. Similarly, it will be understood that the benefits and advantages described above may relate to one embodiment or may relate to several implementations.

The claims are not intended to include, and should not be interpreted to include, means-plus- or step-plus-function limitations, unless such a limitation is explicitly recited in a given claim using the phrase(s) "means for" or "step for," respectively.

The invention claimed is:

1. A method of pulp product manufacture, the method comprising:
spraying a surface enhanced pulp fiber (SEPF) coating on at least a portion of a molded pulp product, the SEPF coating making up between approximately 5% to 15% of the total weight of the molded pulp product and comprising SEPF comprising fibrillated fibers and having a length weighted average fiber length that is at least 0.20 millimeters (mm) and an average hydrodynamic specific surface area that is at least 10 square meters per gram (m²/g); and
performing a thermoforming process on the molded pulp product after spraying the SEPF coating on the molded pulp product, wherein a dwell distance between a thermoforming tooling of the molded pulp product is set from approximately 100 micrometers to 500 millimeters so as to reduce damage to the SEPF coating.

2. The method of claim 1, where spraying the SEPF coating on the at least a portion of the molded pulp product comprises spraying the SEPF coating on an inner surface of the molded pulp product.

3. The method of claim 1, where spraying the SEPF coating on the at least a portion of the molded pulp product comprises spraying the SEPF coating on an outer surface of the molded pulp product.

4. The method of claim 1, where spraying the SEPF coating on the at least a portion of the molded pulp product comprises spraying the SEPF coating on an inner surface and an outer surface of the molded pulp product.

5. The method of claim 1, where spraying the SEPF coating comprises:
providing the molded pulp product to one or more nozzles; and
ejecting the SEPF coating from the one or more nozzles onto the molded pulp product.

6. The method of claim 1, further comprising performing a molding process on a layer of pulp to form the molded pulp product, where the molding process comprises an injection molding process, a compression molding process, a transfer molding process, an extrusion molding process, a blow molding process, a dip molding process, a rotational molding process, a foam molding process, or a combination thereof.

7. The method of claim 1, further comprising performing a drying process, on the molded pulp product after spraying the SEPF coating on the molded pulp product.

8. The method of claim 1, further comprising setting a spray time of the SEPF coating to control an amount of the SEPF coating that is deposited on the molded pulp product.

9. The method of claim 8, where the spray time is approximately 35 to 90 seconds, and where the amount of the SEPF coating that is deposited on the molded pulp product is approximately 90 to 300 grams per square meter (g/m²).

10. The method of claim 1, wherein the spraying is initiated based on a trigger from a photoelectric object sensor.

11. The method of claim 1, wherein the SEPF coating comprises a sustainable coating.

* * * * *